US009619676B2

(12) United States Patent
Valentine et al.

(10) Patent No.: US 9,619,676 B2
(45) Date of Patent: Apr. 11, 2017

(54) TOUCH SENSOR AND RADIO FREQUENCY IDENTIFICATION APPARATUS AND METHOD

(71) Applicant: Google Technology Holdings LLC, Mountain View, CA (US)

(72) Inventors: Mark F. Valentine, Kenosha, WI (US); Pavel A. Shostak, Evanston, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 748 days.

(21) Appl. No.: 13/705,646

(22) Filed: Dec. 5, 2012

(65) Prior Publication Data

US 2014/0152425 A1 Jun. 5, 2014

(51) Int. Cl.
*G06K 7/01* (2006.01)
*G06F 3/00* (2006.01)
*G06K 19/07* (2006.01)

(52) U.S. Cl.
CPC ............... *G06K 7/01* (2013.01); *G06F 3/00* (2013.01); *G06K 19/0716* (2013.01)

(58) Field of Classification Search
CPC ...... G06K 7/00; G06K 7/0004; G06K 7/0008; G06K 7/0095; G06K 7/10; G06K 7/10376; G06K 7/10475; G06K 7/01; G06K 7/10237; G06K 19/0716; G01S 1/02; G01S 1/028; G01S 1/68; G01S 13/75; G01S 13/765; G01S 13/876; G01S 13/878; G06F 3/00; H04B 5/00; H04B 5/0043

(Continued)

(56) References Cited

U.S. PATENT DOCUMENTS 5,691,639 A 11/1997 Demma et al.
5,952,822 A 9/1999 Kayserman et al.
(Continued)

FOREIGN PATENT DOCUMENTS

WO 2005059859 A1 6/2005

OTHER PUBLICATIONS

Anonymous, RD511027A, Nov. 10, 2006, p. 1.*
(Continued)

*Primary Examiner* — Brian Wilson
(74) *Attorney, Agent, or Firm* — Faegre Baker Daniels LLP

(57) ABSTRACT

A touch sensor and RFID apparatus is described. In one implementation, the apparatus includes a passive RFID module disposed proximate to a touch panel, and a control module configured to receive an electrical signal from the passive RFID module. The apparatus may be configured to determine, based on a characteristic of the electrical signal, whether the passive RFID module has been energized by an RFID reader or, in the alternative, has exhibited an impedance change as a result of contact being made with the touch panel. The apparatus may also be configured to operate in a first mode if the passive RFID module is determined to have been energized by an RFID reader, or, in the alternative, operate in a second mode if the passive RFID module is determined to have been energized as a result of contact being made with the touch panel. Additionally, the control module can read from or write to the passive RFID module via direct electrical excitation over a wire or wires connecting the passive RFID module to the control module.

16 Claims, 6 Drawing Sheets

(58) Field of Classification Search
USPC ............ 340/505, 514, 539.1, 539.16, 539.2,
340/539.21, 5.1, 10.1, 10.2, 10.3, 10.4,
340/10.5, 10.6, 10.51, 572.1–572.8;
370/328, 332; 455/422.1, 423, 446, 448,
455/41.1, 41.2, 41.3
See application file for complete search history.

(56) References Cited

U.S. PATENT DOCUMENTS

| | | | |
|---|---|---|---|
| 6,014,022 A | 1/2000 | Demma et al. | |
| 6,380,930 B1 | 4/2002 | Van Ruymbeke | |
| 7,306,144 B2 | 12/2007 | Moore | |
| 8,040,329 B2 | 10/2011 | Vos | |
| 9,048,882 B2* | 6/2015 | Yang | H04B 5/0012 |
| 2004/0229569 A1* | 11/2004 | Franz | 455/66.1 |
| 2007/0057790 A1 | 3/2007 | Alden et al. | |
| 2007/0210923 A1* | 9/2007 | Butler | G06K 7/0008 340/572.8 |
| 2009/0167699 A1* | 7/2009 | Rosenblatt et al. | 345/173 |
| 2012/0044154 A1* | 2/2012 | Black et al. | 345/173 |
| 2012/0202421 A1* | 8/2012 | Moosavi | H04W 52/0254 455/41.1 |
| 2012/0206391 A1* | 8/2012 | Kim et al. | 345/173 |
| 2014/0191988 A1* | 7/2014 | Corrion | 345/173 |

OTHER PUBLICATIONS

Patent Cooperation Treaty, International Search Report and Written Opinion of the International Searching Authority for International Application No. PCT/US2013/070662, Feb. 26, 2014, 9 pages.

* cited by examiner

TOUCH SENSOR AND RADIO FREQUENCY IDENTIFICATION APPARATUS AND METHOD

TECHNICAL FIELD

The disclosure relates generally to Radio Frequency Identification (RFID) communication and, more specifically, to a touch sensor and RFID apparatus and method.

BACKGROUND

RFID is increasingly being used by many types of devices. "RFID" refers to a technology that allows devices to communicate with one another using electromagnetic fields to induce current flow at a distance, typically a short distance, without the need for the devices to touch one another. RFID-capable devices often communicate using a standardized protocol, such as the Near Field Communication (NFC) protocol. An example of a device that uses RFID technology is an RFID tag. An RFID tag does not have its own source of power, but relies for power on current that is inductively generated by a nearby RFID-enabled device that itself is powered. The powered RFID-enabled device is typically referred to as an "initiator" or "reader," while the unpowered device (e.g., the RFID tag) is typically referred to as the "target."

DRAWINGS

Various embodiments of the present invention will be described below in more detail with reference to the accompanying drawings.

It is to be noted, however, that the appended drawings illustrate embodiments of this invention and are therefore not to be considered limiting of its scope, for the invention may admit to other equally effective embodiments. For example, although components are depicted as being next to one another, it is understood that there may be many intervening components that will still permit the components to be electrically coupled FIGS. 1A-1C depict operating modes according to various embodiments of the invention.

DESCRIPTION

Figure 1A:
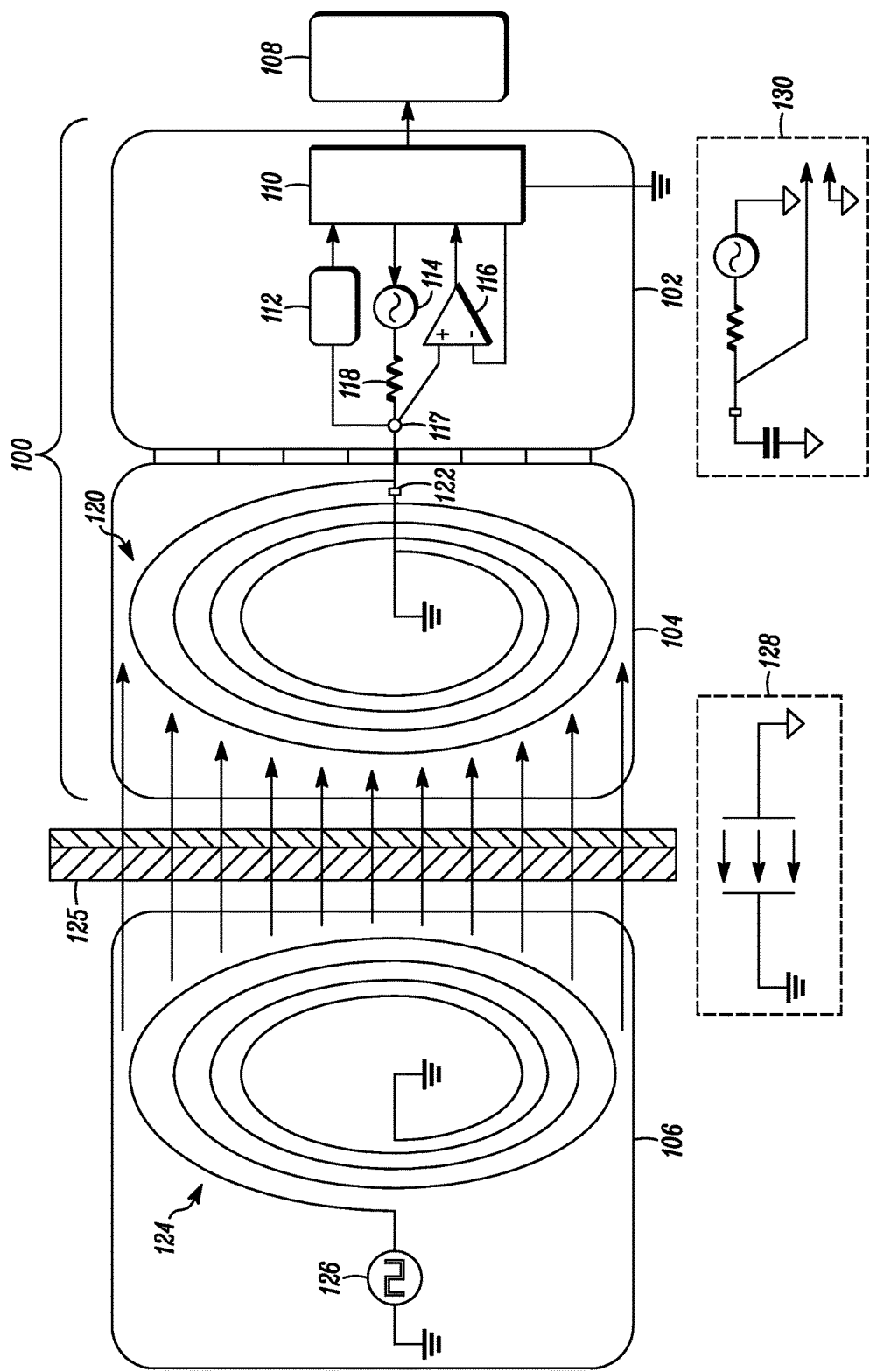

In the present disclosure, when two or more components are "electrically coupled," they are linked such that electrical signals from one component will reach the other component, even though there may be intermediate components through which such signals may pass. Furthermore, references to "electromagnetic," as in electromagnetic coupling, are meant to encompass both "inductive" and "capacitive" interactions.

The term "touch panel" as used herein includes surfaces that users touch, either with or without a touch panel accessory, to cause some action to occur or to enter data. Examples of touch panels include touch screens. Touch panels do not necessarily have integrated displays like touch screens.

The term "touch panel accessory" as used herein refers to those devices that have electrical properties sufficient to be detected by the various embodiments described herein. Examples of touch panel accessories include an appropriately configured stylus or pointer.

In one embodiment of the invention, an apparatus includes a passive RFID module, a touch sensing element, an RFID reader sensing element, and a controller. The passive RFID module functions as both an RFID target and as a touch sensor or "button." The passive RFID module is electrically coupled to the touch sensing element via wire and to the RFID reader sensing element via wire. The touch sensing element and the RFID reader sensing element are both electrically coupled to the controller. If an RFID reader interacts with the passive RFID module, the passive RFID module reacts by transmitting a first type of signal via the wire. The RFID reader sensing element is configured to react to this first type of signal by transmitting an electrical signal to the controller. If a person's finger or a touch panel accessory comes close to or touches the passive RFID module, the passive RFID module reacts by transmitting a second type of signal via the wire. The touch sensing element is configured to react to this second type of signal by transmitting an electrical signal to the controller. If the controller receives a signal from the RFID reader sensing element, the apparatus operates in a first mode. If the controller receives a signal from the touch sensing element, the apparatus operates in a second mode.

In an embodiment of the invention, the RFID reader interrogates the passive RFID module (e.g., by transmitting an interrogation command using an RFID protocol) and obtains data from the passive RFID module thereby. In another embodiment, the RFID reader writes to the passive RFID module (e.g., by transmitting a write command using an RFID protocol).

In some embodiments, the passive RFID module is disposed on the underside of a touch panel. The touch panel is a component of another device, such as a smart phone, interactive kiosk, automated teller machine (ATM), picture frame, or doorbell.

According an embodiment of the invention, the passive RFID module is electrically coupled to a signal generator. The signal generator is electrically coupled to the controller. The apparatus is configured to operate in a third mode, in which the controller transmits a signal that contains data and a write command (e.g., using an RFID protocol). The signal is modulated by the signal generator under control of the controller. The modulated data signal is transmitted to the passive RFID module, and causes the RFID module to react just as if it was interacting with an external RFID reader. The passive RFID module stores the data into a memory in its own controller, which is integrated with the passive RFID module.

In another embodiment, the apparatus is also configured to operate in a fourth mode, in which the controller transmits a signal that contains data and an interrogation command (e.g., using an RFID protocol). The signal is modulated by a signal generator under control of the controller. The modulated data signal is transmitted to the passive RFID module, and causes the RFID module to react just as if it was interacting with an external RFID reader. The controller of the passive RFID module emits a signal containing data retrieved from the controller of the passive RFID module. The passive RFID module transmits the retrieved data via wire. The RFID reader sensing element detects the signal from the passive RFID module, and transmits a signal containing the data to the controller.

In an embodiment of the invention, an apparatus includes a touch panel, a passive RFID module disposed proximate to the touch panel, and a control module configured to send and receive an electrical signal to or from the passive RFID module. The control module includes a controller. The controller is configured to determine, based on a characteristic of an electrical signal received from the passive RFID module whether the passive RFID module has been energized by an RFID reader, or, in the alternative, has exhibited an impedance change as a result of contact being made (e.g., by a finger or touch panel accessory) with the touch panel.

If the controller determines that the passive RFID module has been energized by an RFID reader, the apparatus operates in a first mode. Alternatively, if the controller determines that the passive RFID module has exhibited an impedance change as a result of contact being made by a finger or touch panel accessory, the apparatus operates in a second mode.

In another embodiment of the invention, a method includes receiving an electrical signal from a passive RFID module, determining, based on a characteristic of the electrical signal (such as frequency or voltage), whether the passive RFID module is being energized by an RFID reader, or is exhibiting an impedance change as a result of contact (e.g., by a human touch or touch panel accessory) being made with a touch panel. If the passive RFID module is determined to have been energized by an RFID reader, operation occurs in a first mode. In the alternative, if the passive RFID module is determined to have exhibited an impedance change as a result of contact being made with the touch panel, operation occurs in a second mode.

In still another embodiment of the invention, a mobile device comprises an RFID/Sensor module and a touch panel. The RFID/Sensor module includes a host processor, a passive RFID module disposed proximate to the touch panel, and a control module that is communicatively linked to the host processor and electrically coupled to the passive RFID device. In this embodiment, the control module comprises a controller, a reader sensing element, a signal generator, and a touch sensing element. Each of the signal generator and touch sensing element are electrically coupled to the controller. The RFID/Sensor module operates in at least four modes.

In a first mode of the RFID/Sensor module, the passive RFID module is energized by an external RFID reader, and a signal passes from the passive RFID module to the RFID reader sensing element, which responds by sending a signal to the controller. The sent signal informs the controller that an RFID reader is interacting with the passive RFID module, such as by reading from or writing to the passive RFID module.

In a second mode, of the RFID/Sensor module, the passive RFID module is capacitively loaded by the touch of a human or by the touch of a touch panel accessory, resulting in an impedance change that is detected by the touch sensing element. The touch sensing element responds by outputting a signal indicating to the controller that the touch panel is being touched.

In a third mode of the RFID/Sensor module, the controller outputs a data-containing continuous carrier signal that is modulated by the signal generator. The signal generator provides the modulated signal to the passive RFID module. The modulated signal writes data to the passive RFID module.

In a fourth mode of the RFID/Sensor module, the control module interrogates the passive RFID module by applying a continuous carrier signal (modulated by the signal generator) to the passive RFID device through a known impedance, and then detecting the load modulation of the passive RFID device immediately after interrogation.

Referring to FIG. 1A, an embodiment of the invention will now be described. FIG. 1A depicts an RFID/Sensor module 100 and a host 108. The host 108 is communicatively linked to the RFID/Sensor module 100. The host 108 may be implemented as, for example, a server, or a stand-alone host processor such as an application or baseband processor. The RFID/Sensor module 100 includes a control module 102 and a passive RFID module 104. The control module 102 is electrically coupled to the passive RFID module 104. A touch panel 125 is disposed proximate to the passive RFID module 104. The touch panel 125 and the RFID/Sensor module 100 may be integrated with another device, such as a mobile device (e.g., smart phone, tablet computer, notebook computer), a stationary device (e.g., kiosk, stationary personal computer), and the like. The control module 102 may be a single integrated circuit containing all of its components, or its components may be discrete elements. The passive RFID module 104 may be implemented as a passive RFID tag, may have its components distributed, or may be integrated into the touch screen. In various embodiments, the passive RFID module 104 is capable of close-range wireless communication using one or more wireless protocols, such as the Near Field Communication (NFC) protocol. Interaction between the control module 102 and the passive RFID module 104 during operation of the RFID/Sensor module may be modeled with the equivalent circuit 130 shown in FIG. 1A.

The control module 102 includes a controller 110, an RFID reader sensing element 112, a signal generator 114, and a touch sensing element 116. The reader sensing element 112 may be implemented as a Phase Locked Loop (PLL) circuit, and the touch sensing element 116 may be implemented as an amplifier. A resistive unit (e.g., a resistor) 118 is linked in series with the signal generator 114. The reader sensing element 112, signal generator 114, and the positive input of the touch sensing element 116 share a common electrical connection at a junction 117. The RFID controller 122 of the RFID module 104 is electrically coupled to the reader sensing element 112, the touch sensing element 116 and the signal generator 114 via wire at the junction 117. The reader sensing element 112 and the output of the touch sensing element 116 are each coupled to respective inputs (e.g., input pins) of the controller 110, while the signal generator 114 and the negative input of the touch sensing element 116 are coupled to respective outputs (e.g. output pins) of the controller 110. An output of the controller 110 is communicatively linked to the host 108.

The passive RFID module 104 includes a coil 120 and an RFID controller 122 that is electrically coupled to the coil 120. The coil 120 is electrically coupled via a resonance circuit to the RFID controller 122. The RFID controller 122 includes a memory capable of storing data.

According to an embodiment of the invention, the RFID/Sensing module 100 operates in four different modes: (1) a passive RFID mode (first mode), (2) a touch sensing mode (second mode), (3) a write data transfer mode (third mode), and (4) a read data transfer mode (fourth mode).

In first mode, the passive RFID module 104 acts as an RFID target, with the electromagnetic field being generated by an initiator that is outside of the RFID/Sensor module 100.

In the second mode, the passive RFID module 104 is capacitively loaded by a human touch (or the touch of touch panel accessory), resulting in an impedance change that is detected by the touch sensing element 116.

In the third mode and in the fourth mode, the control module 102 energizes the passive RFID module 104 by applying a continuous carrier signal (modulated by the signal generator) to the passive RFID device through a known impedance. In theses two modes, the passive RFID module 104 acts as a target, and the control module 102 acts as the initiator, although the initiation signal is provided through the wire. In the third mode, the control module 102 writes to the passive RFID module 104. In the fourth mode, the control module 102 interrogates and reads from the passive RFID module 104.

In an embodiment of the invention, the RFID/Sensor module 100 enters the first or second modes based on a determination made by the control module 102. More particularly, when an RFID reader or a finger (or touch panel accessory) touches the touch panel 125, the passive RFID module 104 generates a corresponding signal. The control module 102 determines, based on electrical characteristics of the signal, whether an RFID reader is present, or whether the touch panel is being touched. If the control module 102 determines that a reader is present, then the RFID/Sensing module 100 operates in the first mode. If, on the other hand, the control module 102 determines that there is not a reader present, but rather that the touch panel 125 is making contact with something (e.g., a finger or touch panel accessory), the RFID/Sensing module 100 operates in the second mode.

In one embodiment of the invention, components of the control module 102 cooperate to process a signal resulting from the capacitive coupling of the passive RFID module 104 from an external source. These components include the reader sensing element 112, the touch sensing element 116, and the controller 110. The controller 110 determines what kind of signal is being generated in the passive RFID module 104 based on signals that the controller 110 receives from the reader sensing element 112 and the touch sensing element 116.

Instead of the controller 110 making the determination regarding whether an RFID reader is present or touch panel contact is being made, the controller 110 may send, to the host 108, raw data that is based on signals from the touch sensing element and the reader sensing element. In such an embodiment, the host 108 may make the determination and order the RFID/Sensor module 100 (via the controller 110) into one of the four modes.

According to some embodiments of the invention, the first mode and the second mode are mutually exclusive. That is, the controller 110 deems that an RFID reader is present only if the characteristics of the signal (e.g., frequency and voltage) received by the passive RFID module 104 meet the criteria for being from an RFID reader. Similarly, the controller 110 deems that a human or touch panel accessory has touched the touch panel 125 only if the characteristics of the signal received by the control module 104 meet the criteria for being from human or touch panel accessory contact with the touch panel 125.

For example, because the electrical characteristics of a signal induced by a human touch on the touch panel are significantly different from the electrical characteristics of a signal generated by an RFID reader (due to differences in the electromagnetic fields of the reader and the electrically passive nature of human tissue), the logic programmed into the controller, in effect, treats the two possibilities as separate, non-overlapping decision paths. Of course, it is also possible for the induced signal not to fit either criteria (e.g., if induced by background electromagnetic fields), in which case the controller 110 does not react.

Referring to FIG. 1A, the first mode of operation will now be described according to an embodiment of the invention. A signal generator 126 of an RFID reader 106 sends an electrical signal (a current) through a coil 124 of the RFID reader 106. The signal may contain RFID protocol interrogation commands. The electrical signal through the coil 124 creates an electromagnetic field coupling between the coil 124 of the reader 106 and the coil 120 of the passive RIFD module 104 in the forward path, thereby inducing an electrical signal in the coil 120 of the passive RFID module 104.

The signal induced in the coil 120 has one or more characteristics of the signal generated by the reader 106. The signal induced in the coil 120 is transmitted to the RFID reader sensing element 112 and to the touch sensing element 116. The signal will exhibit one or more characteristics. The reader sensing element 112 and the touch sensing element 116 output signals based on the one or more characteristics. Examples of such signal characteristics are voltage and frequency. The outputs of the reader sensing element 112 and the touch sensing element 116 are received by the controller 110, which determines, based on the received outputs, whether the passive RFID module 106 is being energized by an RFID reader (e.g., is being interrogated according to the NFC protocol) or is exhibiting an impedance change caused by contact with the touch panel 125 by a finger or touch panel accessory.

In an embodiment of the invention, the reader sensing element 112 outputs a signal only when the signal that it receives as an input is at predetermined frequency (e.g. 13.56 MHz according to the NFC protocol), and possibly only when the signal is at or above a predetermined voltage. To help illustrate the first mode, it will be assumed that the signal induced by the reader 102 is at the predetermined frequency, and that the reader sensing element 112 reacts by sending the appropriate signal to the controller 110.

The signal induced in the coil 120 of the passive RFID module 104 passes to the RFID controller 122, thereby activating and providing power to the controller 122. In response to being activated, the RFID controller 122 reads the data from its memory and outputs a signal containing the data. The data-containing signal energizes the coil 120 of the passive RFID module 104, thereby generating a second electromagnetic field. The second electromagnetic field contains the data, and which is coded using a protocol (e.g., the NFC protocol). The second electromagnetic field energizes the coil 124 of the reader 106, thereby generating a current that is representative of the signal output by the RFID controller 122 of the passive RFID module 104.

Once the controller 110 of the control module 102 determines that the passive RFID module 104 is being interrogated, the controller 110 responds by transmitting, to the host 108, a signal indicating that an RFID interrogation has occurred. The host 108 responds by executing software that displays a message, via a user interface on the touch panel 125, indicating that an interrogation has occurred. The host 108 may also cause other interactive elements (e.g., a menu, a particular keypad, etc.) to be displayed on the touch panel 125.

Figure 1B:
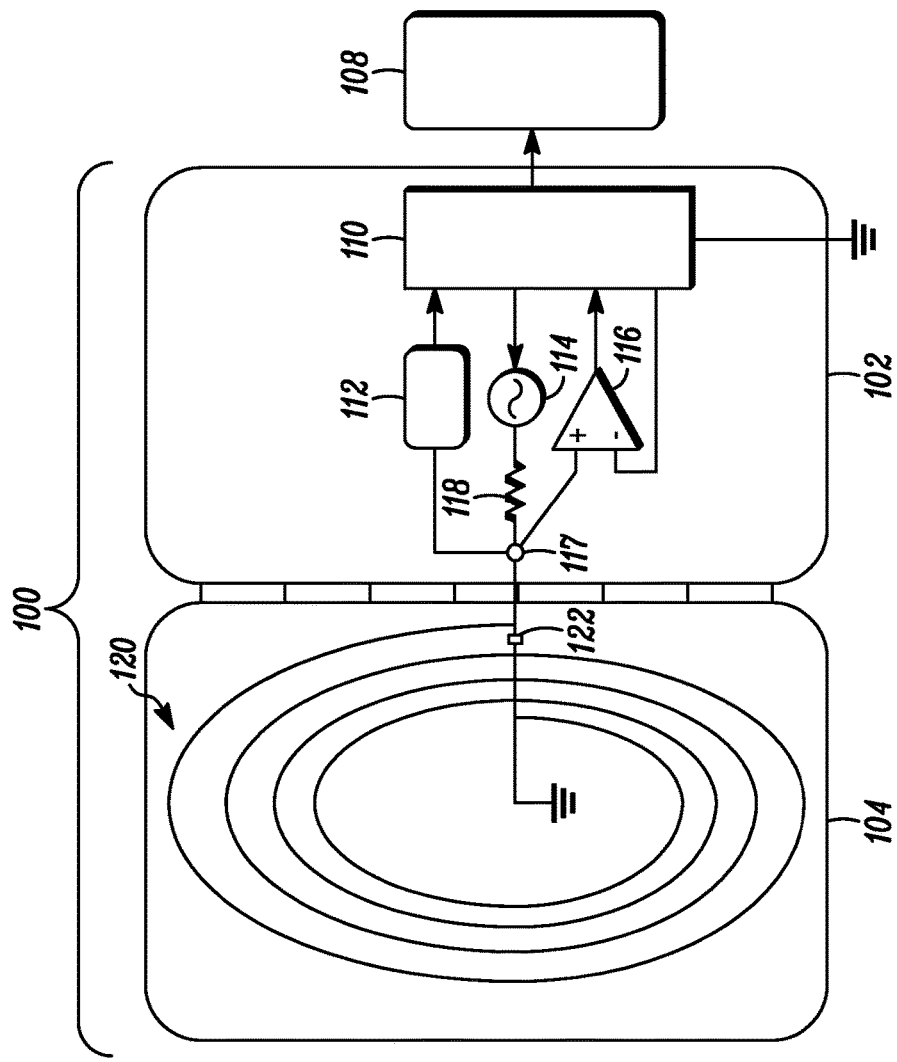
Figure 1B:
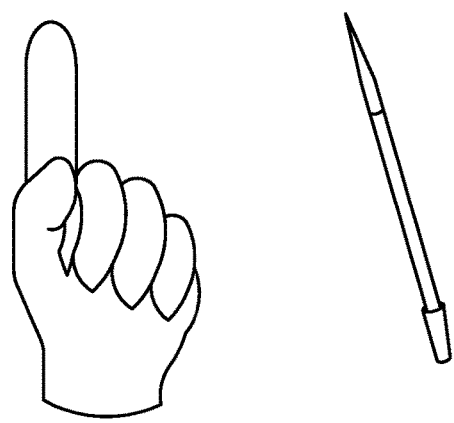

Referring to FIG. 1B, the second mode of operation of the RFID/Sensing module 100 described according to an embodiment of the invention will now be described. In this mode, a human or touch panel accessory takes the place of the reader 106 from the first mode. To aid in the description, it will be assumed that it is a human finger that is making contact with the touch panel 125.

The human finger presents a naturally-occurring capacitance, and, when located in close proximity to the passive RFID module 104, becomes electromagnetically coupled to the passive RFID module 104. The touch sensing element 116 of the control module 102 senses the resulting impedance change, and, in response, transmits a signal to the controller 110. Based on the signal received from the touch sensing element, the controller 110 determines that the touch panel 125 has been touched by a human or touch panel accessory. The controller 110 responds to the signal it receives by transmitting, to the host 108, a signal indicating the occurrence of the touch. This signal may also indicate the location of the touch, such in cases in which there are multiple passive RFID modules coupled to the controller module 102, and in which each passive RFID module is located near, for example, a different portion of the touch panel 125 than the other passive RFID modules. The host 108 responds by displaying an indication of the touch on the touch panel (e.g., lighting up a key to give the user feedback indicating that the key press was successful). The host may also respond to signal by, for example, executing software for allowing the user to make calls, executing browser software, launching apps, changing settings, etc.

Figure 1C:
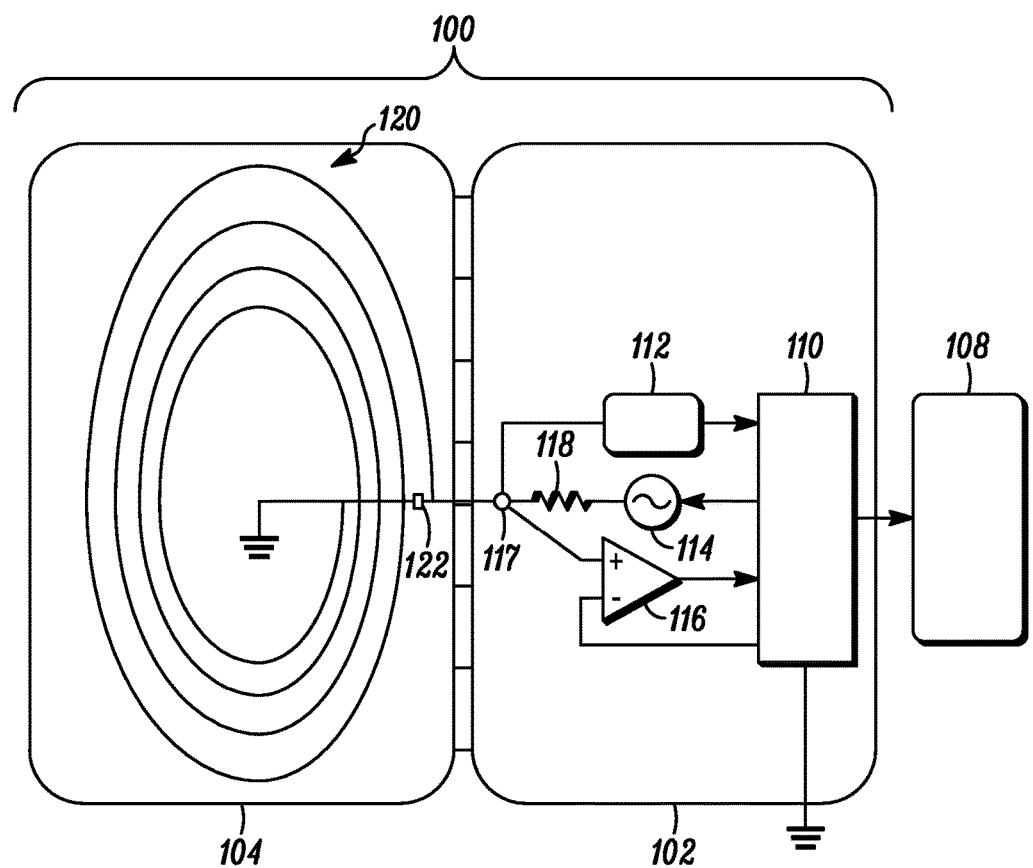

Referring to FIG. 1C, the third mode will now be described according to an embodiment of the invention. In this mode, the RFID control module 102 acts as an RFID initiator (e.g., as an RFID reader). The controller 110 transmits a signal containing data to the signal generator 114. The signal generator 114 modulates the received signal at a particular frequency according a protocol (e.g., 13.56 MHz according to the NFC protocol). The modulated signal contains write commands along with data. This signal passes to the RFID module 104, through the wire and the coil 120. The coil 120 acts as the transmitting element on the forward path. The controller 122 of the passive RFID module 104 responds to the received write commands by storing the received data contained in the signal into its memory. In effect, when the RFID/Sensor module 104 operates in the third mode, the control module 102 writes to the RFID controller 122.

Referring again to FIG. 1C, the fourth mode will now be described according to an embodiment of the invention. In this mode, the RFID control module 102 acts as an RFID initiator (e.g., as an RFID reader), and is able to read data from the passive RFID module 104. The controller 110 transmits a signal containing an interrogation command to the signal generator 114. The signal generator 114 modulates the received signal at a particular frequency according a protocol (e.g., 13.56 MHz according to the NFC protocol). This signal passes to the RFID module 104, through the wire and the coil 120. The coil 120 acts as the transmitting element on the forward path, and acts as the receiving element on the reverse path 128. The reverse path signal, which contains the interrogation command, is received by the coil 120 and passes to the controller 122 of the passive RFID module 104. The controller 122 responds to the interrogation command by retrieving data from its memory. The controller 122 of the passive RFID module 104 provides the data to the control module 102 via the coil 120 (on the forward path) as a load impedance modulation. In effect, when the RFID/Sensor module 100 operates in the fourth mode, the control module 102 reads data from the passive RFID module 104.

In an embodiment of the invention, the RFID/Sensor module 100 initiates the transfer of data from the control module 102 to the RFID reader 106. The RFID/Sensor module 100 does so by operating in the third mode to write data to the passive RFID module 104. The reader 106 then sends interrogation commands (e.g., NFC interrogation commands) to the passive RFID module 104. The RFID/Sensor module 100 responds by operating in the first mode, in which the data is transferred from the passive RFID module 104 to the reader 106. The result of this process is that the data (which may initially be stored in memory of the controller 110) gets transferred from the control module 102 to the reader 106 at the initiation of the control module 102 (under control of the controller 110).

In another embodiment of the invention, the reader 106 can transfer data to the RFID/Sensor module 100. To do so, the reader 106 writes to the memory of the controller 122 of the passive RFID module 104. The reader 106 performs this writing operation using the same procedure that the reader 106 uses when interrogating the passive RFID module 104, except that instead of issuing interrogation commands, the RFID reader issues write commands (e.g., NFC write commands) to the passive RFID module 104. The RFID/Sensor module 100 responds by entering the first mode. In response to the write commands, the controller 122 of the passive RFID module 104 stores the data that it receives (via capacitive coupling between the coil 124 of the reader 106 and the coil 120 of the passive RFID module 104). The RFID/Sensor module 100 then operates in the fourth mode, in which it reads the data from the the passive RFID module 104.

Figure 2A:
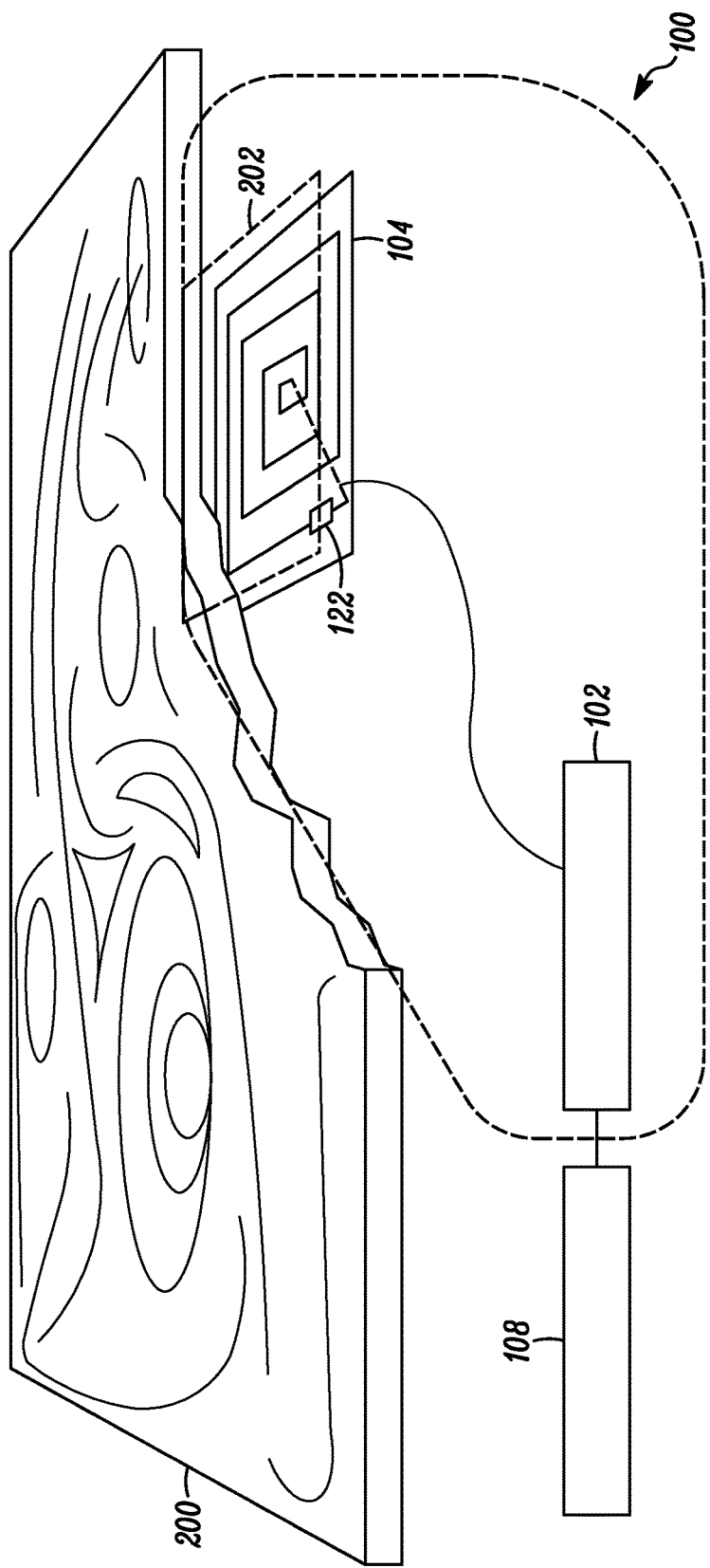
FIGS. 2A and 2B depict the placement of a passive RFID module according to embodiments of the invention.

Referring to FIG. 2A, the placement of the passive RFID module 104 within another device according to an embodiment of the invention will now be described. The passive RFID module 104 is disposed on the reverse side (i.e., the side facing away from the user) of a touch panel 200, and is configured to react to the proximity of a user's finger when the user's finger is within a touch zone perimeter 202 on the touch panel 200. The touch panel 200 may have an overlay, which has printed artwork, glass, plastic, etc. disposed on its front surface. Alternatively, the touch panel 200 could be an opaque surface onto which a video image is projected. The passive RFID module 104 is electrically coupled to the controller 110 which, in turn, is communicatively linked to the host 108. The controller 110 and the passive RFID module 104 are included in the RFID/Sensor module 100, and are coupled to the other components of the RFID/Sensor module 100, but these other components are not shown in FIGS. 2A and 2B. The operation and operating modes of the RIFD/Sensor module 100 have been described previously.

Figure 2B:
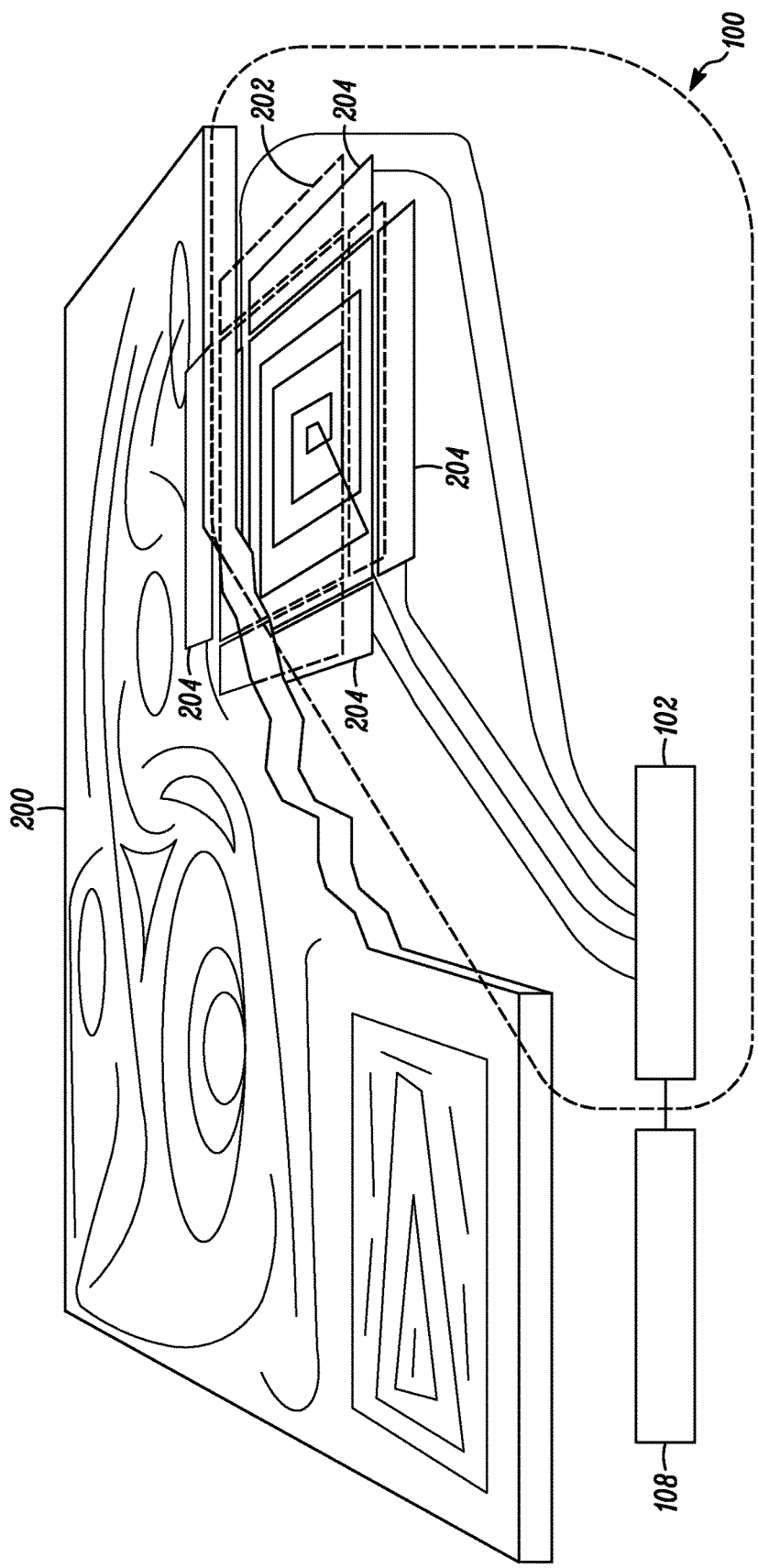

Referring to FIG. 2B, another embodiment of the invention will now be described. In this embodiment, lateral electrodes 204 are disposed on the sides of the passive RFID module 104, and are coupled to the passive RFID module 104. In one embodiment, current flows from the lateral electrodes 204 to the passive RFID module 104 in the presences of an electrical field emanating from the reader 106. With this configuration, the RFID/Sensor module 100 can determine where the passive RFID module 104 is located relative to the reader 106 (from FIG. 1A) based on the relative strengths of the currents received from each of the lateral electrodes 204. The controller may also determine the relative location of a finger on the touch panel 200 in the same manner. In one embodiment, the RFID/Sensor module 100 is in a mobile device, which has visual indicators that indicate how far off center the device is with respect to the passive RFID module 104 and the RFID reader 106.

In a related embodiment, the RFID/Sensor module 100 may further include additional passive RFID modules (e.g., RFID tags) that flank the passive RFID module 104 in the same positions as the electrodes 204, which are shown in FIG. 2B. If additional passive RFID modules are employed, each may contain unique data, and may perform the same functions as the electrodes 204.

Figure 3:
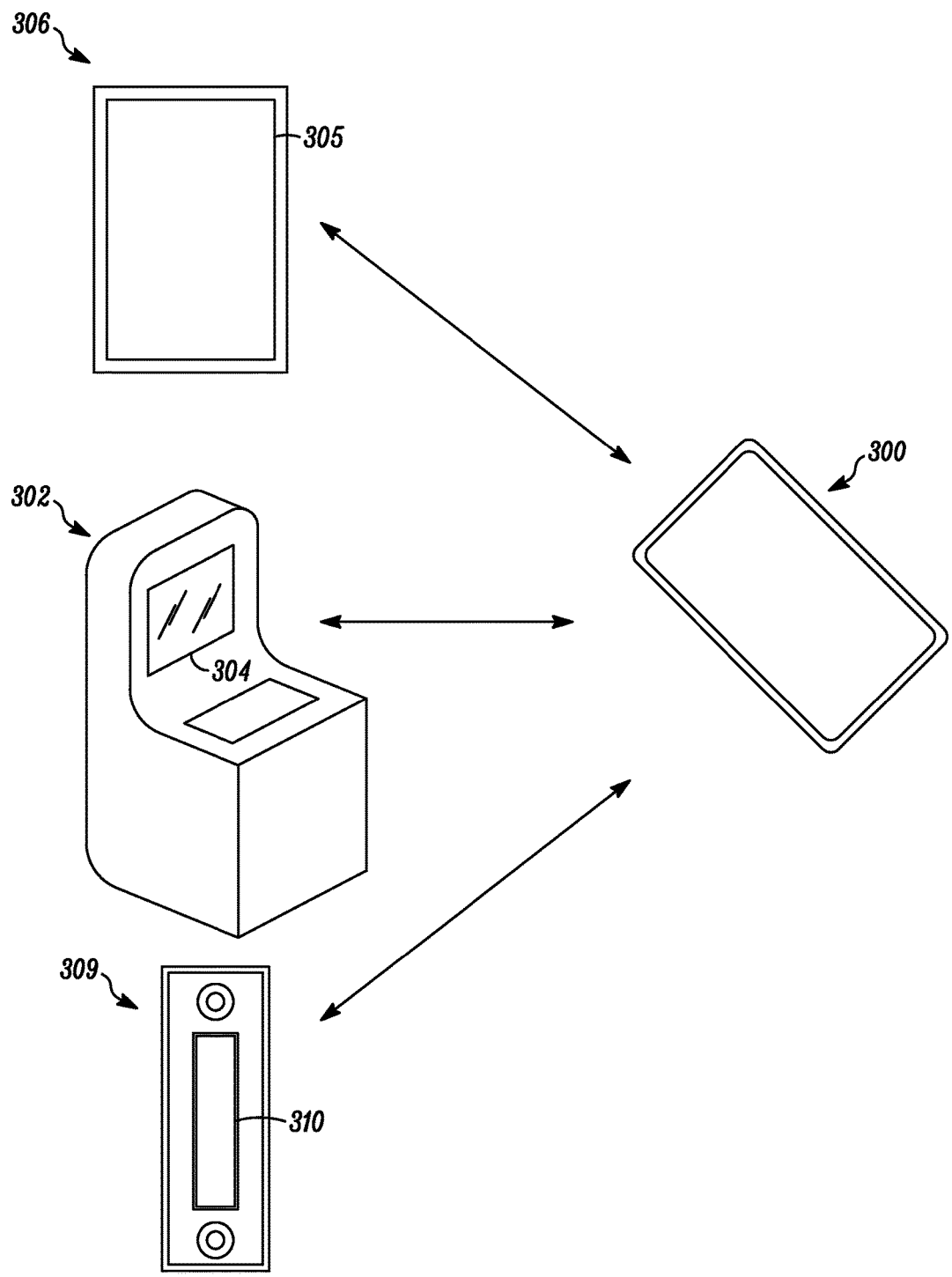
FIG. 3 depicts various devices that incorporate an embodiment of the invention.

Referring to FIGS. 1A and 3, examples of how a mobile device having the RFID/Sensor unit 100 may be used in various embodiments will now be described. In one example, a mobile device 300 interacts with a kiosk 302. In this example, the kiosk 302 is a movie rental station, and includes the RFID/Sensor module 100, with the passive RFID module being disposed under and proximate to the touch panel 304 of the kiosk 302. The mobile device 300 includes the reader 106. The touch panel 304 displays an arrangement of images (e.g., DVD box cover pictures). Each image represents different media content (e.g., movies) with the details (e.g., link to a trailer) and order information displayed on the touch panel 304. To order media content, the user presses the panel with a finger. In this case, the control module 102 of the RFID/Sensor module 100 operates in the touch sensing mode. The kiosk 302 then brings up a user interface, on which the user can enter the relevant information and have the content dispensed by the kiosk.

Continuing with the example, the user may also obtain media content by bringing the mobile device 300 within close proximity to the image on the touch panel 304 that is relevant to the media content (e.g., the photo used to advertise a movie). The RFID reader 106 of the mobile device 300 interrogates the passive RFID module 104 of the kiosk 302. The RFID/Sensor module 100 of the kiosk 302 responds to the interrogation by operating in the first mode. The RFID reader 106 transfers relevant personal information (credit card number, etc.) to the passive RFID module 104. Alternatively, the RFID/Sensor module 100 may operate in the third mode, in which the control module 102 of the kiosk 302 transfers data to the memory of the controller 122 of the passive RFID module 104 (e.g., information needed for the user to order the content online, such as a web link and a validation code). The RFID reader 106 of the mobile device 300 then interrogates the passive RFID module 104. The RFID/Sensor module 100 responds by operating in the first mode, in which the data is transferred from the memory of the controller 122 to the reader 106. The user of the mobile device 300 can then use the transferred data to obtain the content.

In another embodiment, the RFID/Sensor module 100 is integrated within a digital picture frame 306, with the passive RFID module disposed under a touch panel 305 of the digital picture frame 306. The RFID/Sensor module 100 operates in the second mode, in which it scrolls pictures, enlarges selected pictures in response to a user touching an area that is proximate to the passive RFID module 104. The RFID/Sensor module 100 also operates in the first mode, in which the passive RFID module 104 responds to an interrogation by an RFID reader 106, which in this example is integrated with the mobile device 300. For example, when the user brings the mobile device 300 near the frame, the RFID reader 106 interrogates the passive RFID module 104, which informs the controller 110 that there has been an interrogation. The frame 306 responds by ceasing to cycle though pictures, and continues statically displaying the most recently displayed picture. The reader 106 then reads the passive RFID module 106 to obtain pairing information, such as Bluetooth or Wi-Fi pairing information, which is stored in the memory of the controller 122 of the passive RFID module 104 The mobile device 300 uses this pairing information to pair with the frame 306 via Wi-Fi or Bluetooth. The frame 306 then downloads the displayed picture to the mobile device 300 via, for example, Bluetooth or WiFi. The user may then move the mobile device 300 away from the picture frame 306. The frame 306 then un-pairs with the mobile device 300, and then resumes cycling through the images.

Alternatively, the mobile device 300 can be removed from the frame 306 after the initial exchange of Bluetooth or WiFi pairing is completed via RFID. The rest of the transfer may then occur via Bluetooth or WLAN. The frame then un-pairs with the mobile device and resumes scrolling of displayed images Alternatively, if the picture frame 306 does not support Bluetooth or Wi-Fi, the RFID/Sensor module 100 operates in the third mode, in which the controller 110 writes the name of the file containing the displayed picture onto the passive RFID module 104. The mobile device 300 then interrogates the passive RFID module 104. The RFID/Sensor module 100 responds by operating in the first mode, in which the passive RFID module 104 transfers the file name to the the reader 106 of the mobile device 300. The mobile device 300 then stores the file name of the displayed picture and prompts the user to (1) move the mobile device away from the frame 306, (2) to scroll through more pictures and repeat the picture selection and download steps, or (3) to connect the mobile device 300 to the frame 306 via universal serial bus (USB). The user may also choose to transfer pictures to or from the frame 306 via removable storage media. To do so, the user removes the storage media of the frame and inserts the media into the mobile device 300. Alternatively, the user connects the mobile device to the frame via USB cable, and searches the storage media while the storage media is still in the frame. The mobile device 300 searches the storage media for the file name on storage media, which is either in the mobile device 300 or is in the memory of the frame 306. In any of these scenarios, the mobile device 300 may prompt the user when all desired file transfers are complete Referring still to FIG. 3, another embodiment will now be described. In this embodiment, the mobile device 300 includes the RFID reader 106, and kiosk 302 is embodied as an ATM (Automated Teller Machine). The ATM 302 in this example includes the RFID/Sensor module 100, with the passive RFID module 104 being located on the underside of the touch panel, embodied as a display screen, in the region of an on-screen keypad. The ATM 302 may include a passive RFID module for each of the on-screen number keys, with the RFID/Sensor module operating in both the first mode (when being interrogated by the mobile device 300) and in the second mode (when the user is pressing the on-screen buttons). For example, the user of the mobile device 300 visits a bank website using a browser on the mobile device 300, and selects the ATM 302 from a list of nearby ATMs. A remotely located server that handles consumer transactions for the bank responds to the user selection by transmitting, to the ATM 302 and the mobile device 300, a common, unique code that the server has assigned to the ATM 302 and to the mobile device 300. The server transmits this code by, for example, to the mobile device via the website, and to the ATM via wireless or wired network. When user arrives at the ATM 302, the RFID reader 106 of the mobile device 300 writes the code to passive RFID module 104 of the ATM. ATM 302 detects the RFID reader in proximity to the on-screen keypad and/or the transmission of the code to the passive RFID module 104. In response, the RFID/Sensor module 100 enters the fourth mode, in which it reads the code from the passive RFID module 104. The ATM 302 checks the code against the unique code assigned to the ATM 302. If there is a match, then the RFID/Sensor module 100 operates in the third mode, in which the ATM 302 writes, to the passive RFID module 104, a transaction code that uniquely identifies the transaction. The reader 106 of the mobile device 300 reads the transaction code from the passive RFID module 104, with the RFID/Sensor module operating in the first mode. The mobile device 300 verifies that the transaction code is valid by transmitting a message with the transaction code to the bank over the cellular network. The bank checks the transaction code and, if there is no problem with the account, authorizes the ATM to dispense cash to the user. The user then presses the buttons on the touch panel 304 to request cash. The RFID/Sensor module 100 responds by operating in the second mode, in which the controller 110 informs the host 108 (e.g., a computer inside the ATM 302) as to which keys are being pressed. In response to receiving, the information regarded the pressed keys, the ATM 302 dispenses cash, and sends a notification of completion of the transaction to the user's account through the public network. The ATM 302 then sends commands to the passive RFID module 104, causing the controller 122 of the passive RFID module 104 to clear the contents of the memory of the RFID controller 122 of the passive RFID module 104.

Referring again to FIG. 3, the RFID/Sensor module 100 may be included in a doorbell 309, with the reader 106 being integrated with the mobile device 300. In this example, the surface of the button 310 acts as a touch panel. When a user touches the button 310, the RFID/Sensor module 100 detects the touch and, in response, operates in the second mode. The controller 110 signals a door chime, which sounds in response. However, if the user brings the mobile device 300 near the doorbell 309, the RFID/Sensor module enters the first mode in response. The controller signals the door chime, which mutes or refrains from chiming in response. The reader 106 may then interrogate the passive RFID module 104, which transfers information, such as a contact phone number that the resident has pre-selected, to the reader 106. The mobile device 300 may react to this transfer by calling the contact number (e.g., the landline or home cell phone) of the resident of the home.

The terms, descriptions and figures used herein are set forth by way of illustration only and are not meant as limitations. Those skilled in the art recognize that many variations are possible within the spirit and scope of the examples. For example, interactions between the control module 102 and the passive RFID module 104 are often described as occurring in a particular order. However, any suitable communication sequence may be used.

What is claimed is:

1. An apparatus comprising:
a passive RFID module;
a control module, coupled to the passive RFID module through a wired connection, configured to receive an electrical signal from the passive RFID module through the wired connection;
wherein the control module is configured to determine, based on a characteristic of the electrical signal, whether the passive RFID module has been energized by an RFID reader, or has exhibited a change of impedance as a result of the proximity of a human or a touch panel accessory;
wherein the apparatus is configured to operate in at least two modes, including:
a first mode if the control module determines that the passive RFID module has been energized by an RFID reader; and
a second mode if the control module determines that the passive RFID module has exhibited a change of impedance as a result of the proximity of a human or a touch panel accessory;
the passive RFID module is disposed proximate to a touch panel, and
in response to the determined change of impedance, the control module indicates that the human or touch panel accessory has made contact with the touch panel.

2. The apparatus of claim 1,
wherein the control module comprises a controller, a reader sensing element electrically coupled to the controller, and a touch sensing element electrically coupled to the controller,
when the characteristic of the electrical signal is that of a predetermined frequency,
the reader sensing element sends a signal to the controller,
the controller determines based on the signal received from the reader sensing element that the passive RFID module has been energized by an RFID reader,
the controller indicates to a host that an RFID reader has been detected, and
the host displays, on the touch panel, an indication of the presence of the RFID reader,
when the characteristic of the electrical signal has exhibited a change of impedance as a result of the proximity of a human or a touch panel accessory,
the touch sensing element sends a signal to the controller,
the controller determines based on the signal received from the touch sensing element that contact has been made with the touch panel,
the controller indicates to the host, that a human or touch panel accessory has made contact with the touch panel, and
the host displays, on the touch panel, an indication of the contact.

3. The apparatus of claim 2,
wherein the indication of the presence of the RFID reader is a message that alerts a user that an RFID reader is interacting with a device with which the apparatus is integrated,
and wherein the contact is made on a button that has been pressed, and the indication of the contact is the button lighting up.

4. The apparatus of claim 1,
wherein the passive RFID module comprises an RFID controller and a coil,
wherein the control module is further configured to transmit, in a third mode of the apparatus, a signal to the passive RFID module, wherein the signal contains data, and
wherein the data is written to the RFID controller.

5. The apparatus of claim 4, wherein the data that has been written to the RFID controller is readable by an RFID reader.

6. The apparatus of claim 1, wherein the passive RFID module is an NFC tag.

7. The apparatus of claim 1, wherein
the control module comprises a controller, a reader sensing element electrically coupled to the controller, and a touch sensing element electrically coupled to the controller,
in response to an RFID reader interrogating the passive RFID module, or in response to the human making contact with the touch panel in an area that is proximate to the passive RFID module, the passive RFID module outputs the electrical signal via the wired connection to the control module,
the reader sensing element is triggered only when one or more characteristics of the electrical signal received from the passive RFID module indicates that the passive RFID module is being interrogated by an RFID reader, the apparatus operates in the first mode in response to the reader sensing element being triggered, the controller, in the first mode of the apparatus, transmits a signal to a host, the signal indicating that an RFID reader is nearby, the touch sensing element is triggered only when one or more attributes of the electrical signal indicate that a human is making contact with the touch panel, the human's contact being proximate to the passive RFID module, the apparatus operates in the second mode in response to the touch sensing element being triggered, the controller, in the second mode of the apparatus, transmits a signal to the host, the signal indicating that the touch panel is being contacted, the controller, in a third mode, transmits a signal containing data to the passive RFID module, wherein the passive RFID module stores the data in a memory of the controller.

8. The apparatus of claim 1, further comprising a kiosk housing, wherein:
the touch panel is disposed on the housing, the touch panel displaying a picture, the picture representing a media content option of a plurality of media content options;
the passive RFID module is disposed on the underside of the touch panel proximate to the picture,
the control module is disposed within the housing,
when the apparatus operates in the first mode, an RFID reader transmits information to the passive RFID module, the information relating to one or more of the plurality of media content options,
when a human has made contact with the touch panel proximate to the passive RFID module, the contact indicating a choice by the human of one or more of the media content options, the apparatus operates in the second mode.

9. The apparatus of claim 1, further comprising an automated teller machine comprising a housing, wherein:
the touch panel is disposed on the housing, the touch panel displaying a plurality of virtual controls, each of the plurality of virtual controls representing a function of a plurality of functions of the automated teller machine;
the passive RFID module is disposed on the underside of the touch panel proximate to a virtual control of the plurality of virtual controls,
the control module is disposed within the housing,
when the apparatus operates in the first mode, an RFID reader transmits information to the passive RFID module, the information relating to one or more of the plurality of functions,
when a human has made contact with the touch panel proximate to the passive RFID module, the contact indicating an activation by the human, of one or more of the virtual controls, the apparatus operates in the second mode.

10. The apparatus of claim 1, further comprising a doorbell housing, wherein:
the touch panel is a button on the housing;
the passive RFID module is disposed on the underside of the touch panel;
the control module is disposed within the housing, when the passive RFID module is energized by an electromagnetic field the apparatus operates in the first mode, in which data containing identity information is transferred from the passive RFID module to the RFID reader, and when a human has made contact with the touch panel proximate to the passive RFID module, the apparatus operates in the second mode, in which the apparatus activates a chime in response thereto.

11. A method, carried out by an apparatus, comprising:
receiving an electrical signal from a passive radio frequency identification module through a wired connection;
determining, based on a characteristic of the electrical signal, whether the passive RFID module is being energized by a RFID reader, or being energized as a result of a proximity of a human or a touch panel accessory;
if the electrical signal exhibits the characteristic of a first signal operating in a first mode, and
if the electrical signal exhibits the characteristic of a second signal, operating in a second mode;
operating in the first mode comprises receiving the first signal and displaying, on a touch panel, an indication of a presence of the RFID reader,
operating in the second mode comprises, receiving the second signal, and indicating, on a user interface, that contact has been made with the touch panel;
applying, to the passive RFID module, a continuous carrier signal that has been modulated, the continuous carrier signal being transmitted via the wired connection to the passive RFID module,
writing data to the passive RFID module using the continuous carrier signal; and
wherein the passive RFID module is disposed proximate to the touch panel, operating in the second mode is carried out when a human or a touch panel accessory makes contact with the touch panel.

12. The method of claim 11, wherein the passive RFID module is an NFC tag.

13. The method of claim 11, further comprising transmitting a response to an interrogation by the RFID reader, the response containing the data.

14. The method of claim 11, further comprising:
displaying a picture on the touch panel, the picture representing a media content option of a plurality of media content options;
in the first mode, receiving, via the passive RFID module, information relating to one or more of the plurality of media content options,
in the second mode, receiving contact from a human on the touch panel, the contact being proximate to the location of the passive RFID module, the contact indicating a choice of one or more of the media content options.

15. The method of claim 11, further comprising:
displaying a plurality of virtual controls on the touch panel, each of the plurality of virtual controls representing a function of a plurality of functions of an automated teller machine;
in the first mode, transmitting information to the passive RFID module, the information relating to one or more of the plurality of functions,
in the second mode, receiving contact by a human, the contact on the touch panel being proximate to the passive RFID module, the contact indicating an activation of one or more of the virtual controls, executing the function corresponding to the virtual control indicated by the contact.

16. A mobile device comprising:
a host processor;
a touch panel;
a passive RFID module disposed proximate to the touch panel;
a control module communicatively linked to the host processor and electrically coupled to the control module, the control module comprising
a controller,
a reader sensing element,
a signal generator, and
a touch sensing element,
each of the reader sensing element, signal generator, and touch sensing element being electrically coupled to the controller,
wherein the control module operates in at least four modes, including
a first mode, in which the passive RFID module is energized by an RFID reader, thereby inducing a signal, and the signal passes from the passive RFID module to the reader sensing element, which responds by outputting a signal indicating to the controller that an RFID reader is interrogating the passive RFID module;
a second mode, in which the passive RFID module is energized by a human touch, thereby inducing a signal, and the signal passes to the touch sensing element, which responds by outputting a signal indicating to the controller that the touch panel is being touched;
a third mode, in which the signal generator modulates a signal containing data output by the controller, and provides the modulated signal to the passive RFID module, thereby writing data to the passive RFID module; and
a fourth mode in which the signal generator modulates a signal containing an interrogation command output by the controller, and provides the modulated signal to the passive RFID module, which responds by providing the data to the controller.

* * * * *